United States Patent
Venugopal et al.

(10) Patent No.: US 12,382,317 B2
(45) Date of Patent: Aug. 5, 2025

(54) JOINT FAILURE OF COMPONENT CARRIER (CC) GROUPS

(71) Applicant: QUALCOMM Incorporated, San Diego, CA (US)

(72) Inventors: Kiran Venugopal, Raritan, NJ (US); Yan Zhou, San Diego, CA (US); Tianyang Bai, Somerville, NJ (US); Tao Luo, San Diego, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/033,079

(22) Filed: Sep. 25, 2020

(65) Prior Publication Data

US 2021/0105060 A1   Apr. 8, 2021

Related U.S. Application Data

(60) Provisional application No. 62/910,797, filed on Oct. 4, 2019.

(51) Int. Cl.
*H04B 7/00* (2006.01)
*H04B 7/08* (2006.01)
(Continued)

(52) U.S. Cl.
CPC ............ *H04B 7/088* (2013.01); *H04L 5/005* (2013.01); *H04W 24/08* (2013.01); *H04W 72/53* (2023.01); *H04L 5/001* (2013.01)

(58) Field of Classification Search
CPC ....... H04B 7/088; H04B 7/0695; H04L 5/005; H04L 5/001; H04L 5/0055; H04L 5/0023;
(Continued)

(56) References Cited

U.S. PATENT DOCUMENTS 11,490,275 B2 * 11/2022 Xu ..................... H04B 7/0619
11,490,442 B2 * 11/2022 Cirik ................. H04W 72/0446
(Continued)

FOREIGN PATENT DOCUMENTS

| CA | 3033533 A1 | 8/2019 |
| WO | 2019023643 A1 | 1/2019 |
| WO | 2019059193 A1 | 3/2019 |

OTHER PUBLICATIONS

R1-1904476 : Title: Enhancements on multi-beam operations; Source: MediaTek Inc.; 3GPP TSG RAN WG1 #96bis; Xi'an, China, Apr. 8-12, 2019 (Year: 2019).*
(Continued)

*Primary Examiner* — Brandon M Renner
(74) *Attorney, Agent, or Firm* — QUALCOMM Incorporated

(57) ABSTRACT

Certain aspects of the present disclosure provide techniques for beam failure detection and recovery. A method that may be performed by a user equipment (UE) includes monitoring one or more reference signals for beam failure detection for a plurality of component carriers (CCs), detecting a beam failure for a subset of one or more CCs of the plurality of CCs based on the one or more reference signals, generating a beam failure recovery request (BFRQ) indicating that a beam failure has occurred for the plurality of CCs in response to the detection of the beam failure for the subset of one or more CCs, and transmitting the BFRQ.

20 Claims, 8 Drawing Sheets

(51) Int. Cl.
  *H04L 5/00* (2006.01)
  *H04W 24/08* (2009.01)
  *H04W 72/53* (2023.01)
(58) Field of Classification Search
  CPC .... H04L 5/0048; H04L 5/0094; H04W 24/08; H04W 72/0493; H04W 24/10; H04W 76/15; H04W 76/19
  See application file for complete search history.

(56) References Cited

U.S. PATENT DOCUMENTS

| | | | | |
|---|---|---|---|---|
| 2012/0213154 | A1* | 8/2012 | Gaal | H04B 7/0608 370/328 |
| 2016/0302203 | A1* | 10/2016 | Liu | H04L 5/0098 |
| 2017/0238316 | A1* | 8/2017 | Li | H04W 72/0453 370/329 |
| 2018/0368124 | A1* | 12/2018 | Liu | H04W 72/21 |
| 2019/0037604 | A1 | 1/2019 | Akkarakaran et al. | |
| 2019/0081691 | A1 | 3/2019 | Nagaraja et al. | |
| 2019/0173740 | A1* | 6/2019 | Zhang | H04L 41/0894 |
| 2019/0230529 | A1 | 7/2019 | Sadiq et al. | |
| 2019/0239245 | A1* | 8/2019 | Davydov | H04L 5/0048 |
| 2019/0357249 | A1* | 11/2019 | Davydov | H04B 7/06 |
| 2019/0357291 | A1* | 11/2019 | Zhou | H04W 76/19 |
| 2020/0007292 | A1* | 1/2020 | Huang | H04W 72/542 |
| 2020/0120584 | A1* | 4/2020 | Yi | H04L 5/0048 |
| 2021/0014022 | A1* | 1/2021 | Yang | H04W 24/10 |
| 2021/0314049 | A1 | 10/2021 | Matsumura et al. | |
| 2021/0315041 | A1* | 10/2021 | Matsumura | H04W 72/21 |
| 2022/0166581 | A1* | 5/2022 | Zhang | H04B 7/0695 |
| 2022/0239437 | A1* | 7/2022 | Matsumura | H04L 5/0051 |

OTHER PUBLICATIONS

R1-1904476: Title: Enhancements on multi-beam operations (Year: 2019).*

International Search Report and Written Opinion—PCT/US2020/052960—ISA/EPO—Dec. 4, 2020.

Mediatek Inc: "Enhancements on Multi-beam Operations," 3GPP Draft, 3GPP TSG RAN WG1 #96bis, R1-1904476, Multi-Beam Operation Final, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Apr. 7, 2019 (Apr. 7, 2019), XP051699726, 12 pages, Retrieved from the Internet: URL: http://www.3gpp.org/ftp/Meetings%5F3GPP%5FSYNC/RAN1/Docs/R1%2D1904476%2Ezip [retrieved on Apr. 7, 2019] the whole document.

* cited by examiner

JOINT FAILURE OF COMPONENT CARRIER (CC) GROUPS

CROSS-REFERENCE TO RELATED APPLICATION

This application claims benefit of and priority to U.S. Provisional Application No. 62/910,797, filed Oct. 4, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for beam failure detection and recovery.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. 5G New Radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam failure detection and recovery operations.

Certain aspects provide a method for wireless communication. The method generally includes monitoring one or more reference signals for beam failure detection for a plurality of component carriers (CCs), detecting a beam failure for a subset of one or more CCs of the plurality of CCs based on the one or more reference signals, generating a beam failure recovery request (BFRQ) indicating that a beam failure has occurred for the plurality of CCs in response to the detection of the beam failure for the subset of one or more CCs, and transmitting the BFRQ.

Certain aspects provide an apparatus for wireless communication. The apparatus generally includes a memory and one or more processors, the memory and the one or more processors being configured to: monitor one or more reference signals for beam failure detection for a plurality of CCs, detect a beam failure for a subset of one or more CCs of the plurality of CCs based on the one or more reference signals, and generate a BFRQ indicating that a beam failure has occurred for the plurality of CCs in response to the detection of the beam failure for the subset of the one or more CCs, and a transmitter configured to transmit the BFRQ.

Certain aspects provide an apparatus for wireless communication. The apparatus generally includes means for monitoring one or more reference signals for beam failure detection for a plurality of CCs, means for detecting a beam failure for a subset of one or more CCs of the plurality of CCs based on the one or more reference signals, means for generating a BFRQ indicating that a beam failure has occurred for the plurality of CCs in response to the detection of the beam failure for the subset of one or more CCs, and means for transmitting the BFRQ.

Certain aspects provide a computer-readable medium having instructions stored thereon to cause an apparatus to monitor one or more reference signals for beam failure detection for a plurality of CCs, detect a beam failure for a subset of one or more CCs of the plurality of CCs based on the one or more reference signals, generate a BFRQ indicating that a beam failure has occurred for the plurality of CCs in response to the detection of the beam failure for the subset of one or more CCs, and transmit the BFRQ.

Certain aspects provide a method for wireless communication. The method generally includes receiving a BFRQ indicating that a beam failure has occurred for a subset of one or more CCs of a plurality of CCs, and performing beam failure recovery operations for the plurality of CCs in response to the indication that the beam failure has occurred for the subset of the one or more CCs of the plurality of CCs.

Certain aspects provide an apparatus for wireless communication. The apparatus generally includes a memory and one or more processors, the memory and the one or more processors being configured to: receive a BFRQ indicating that a beam failure has occurred for a subset of one or more CCs of a plurality of CCs; and a processing system configured to perform beam failure recovery operations for the plurality of CCs in response to the indication that the beam failure has occurred for the subset of the one or more CCs of the plurality of CCs.

Certain aspects provide an apparatus for wireless communication. The apparatus generally includes means for receiving a BFRQ indicating that a beam failure has occurred for a subset of one or more CCs of a plurality of CCs, and means for performing beam failure recovery operations for the plurality of CCs in response to the indication that the beam failure has occurred for the subset of the one or more CCs of the plurality of CCs.

Certain aspects provide a computer-readable medium having instructions stored thereon to cause an apparatus to receive a BFRQ indicating that a beam failure has occurred for a subset of one or more CCs of a plurality of CCs, and perform beam failure recovery operations for the plurality of CCs in response to the indication that the beam failure has occurred for the subset of the one or more CCs of the plurality of CCs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
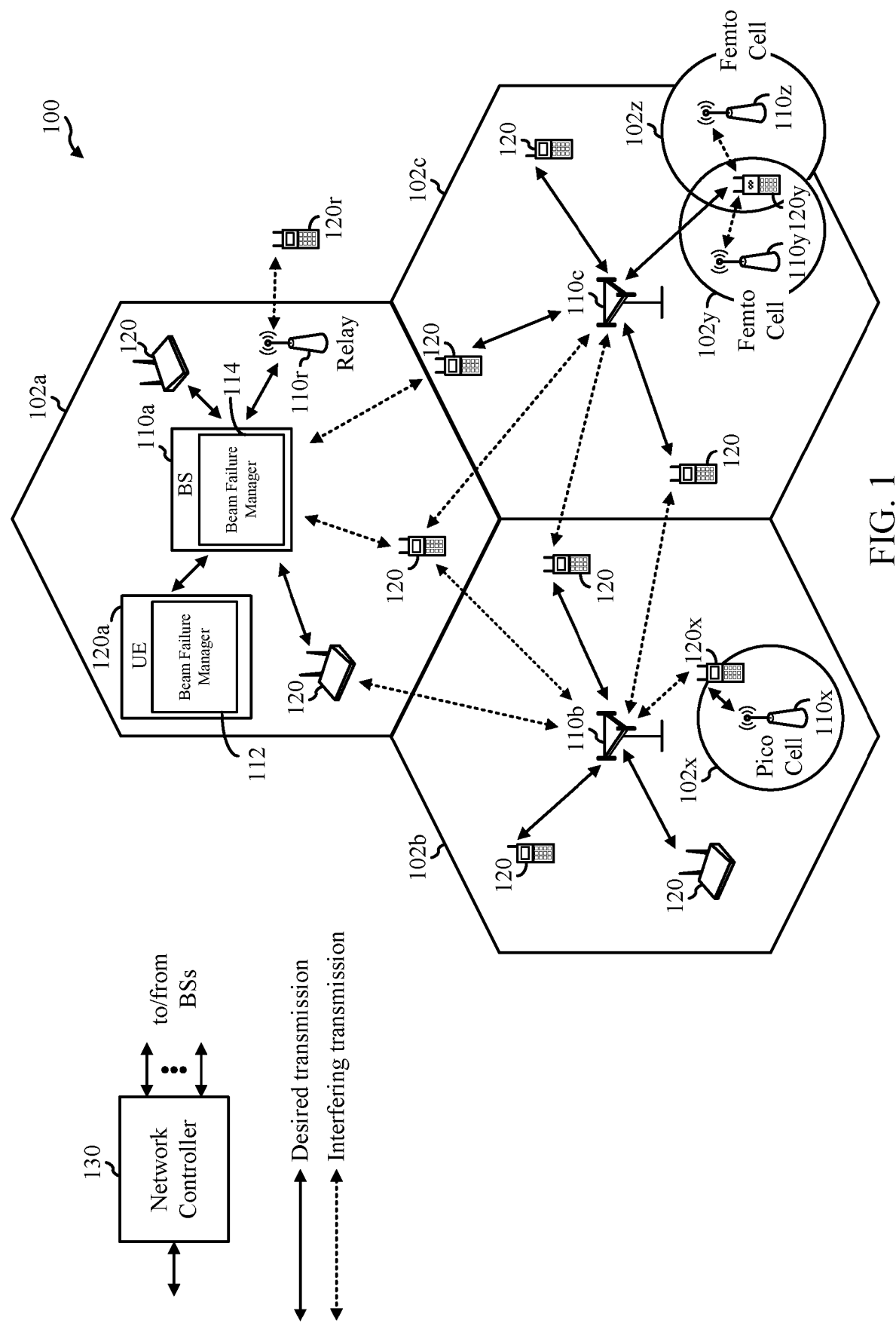
FIG. 1 is a block diagram conceptually illustrating an example telecommunications system, in accordance with certain aspects of the present disclosure.

Aspects of the present disclosure provide apparatus, methods, processing systems, and computer readable mediums for beam failure detection and recovery. For example, certain aspects of the present disclosure provide operations for a joint beam failure detection (BFD) technique of multiple CCs. For instance, the same reference signal may be configured for each of a subset of one or more CCs of a plurality of CCs such that beam failure recovery may be triggered for all the CCs of the group if a beam failure is detected on the subset of one or more CCs. In some cases, a reference signal may be configured for a single CC of a group of CCs sharing the same cell group identifier. In this case, a beam failure detected for the single CC may trigger beam failure recovery for the entire group of CCs. In certain aspects, a UE may monitor reference signals for beam failure detection of CORESETs having distinct quasi-co location (QCL) properties across all CC of the group of CCs. For example, beam failure detected on the CORESETs having distinct QCL properties may trigger beam failure recovery for all the CCs of the group of CCs.

The following description provides examples of beam failure detection and recovery in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for beam failure management. As shown in FIG. 1, the UE 120a includes a beam failure manager 112 and the BS 110a includes a beam failure manager 114. The beam failure managers 112, 114 may be configured to perform joint beam failure detection for multiple component carriers, in accordance with aspects of the present disclosure. For example, beam failure manager 112 may be configured for monitoring one or more reference signals for beam failure detection for a plurality of component carriers (CCs); detecting a beam failure for a subset of one or more CCs of the plurality of CCs based on the one or more reference signals; generating a beam failure recovery request (BFRQ) indicating that a beam failure has occurred for the plurality of CCs in response to the detection of the beam failure for the subset of the one or more CCs of the plurality of CCs; and transmitting the BFRQ. Beam failure manager 114 may be configured for receiving a beam failure recovery request (BFRQ) indicating that a beam failure has occurred for a subset of one or more component carriers (CCs) of a plurality of CCs; and performing beam failure recovery operations for the plurality of CCs in response to the indication that the beam failure has occurred for the subset of the one or more CCs of the plurality of CCs.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
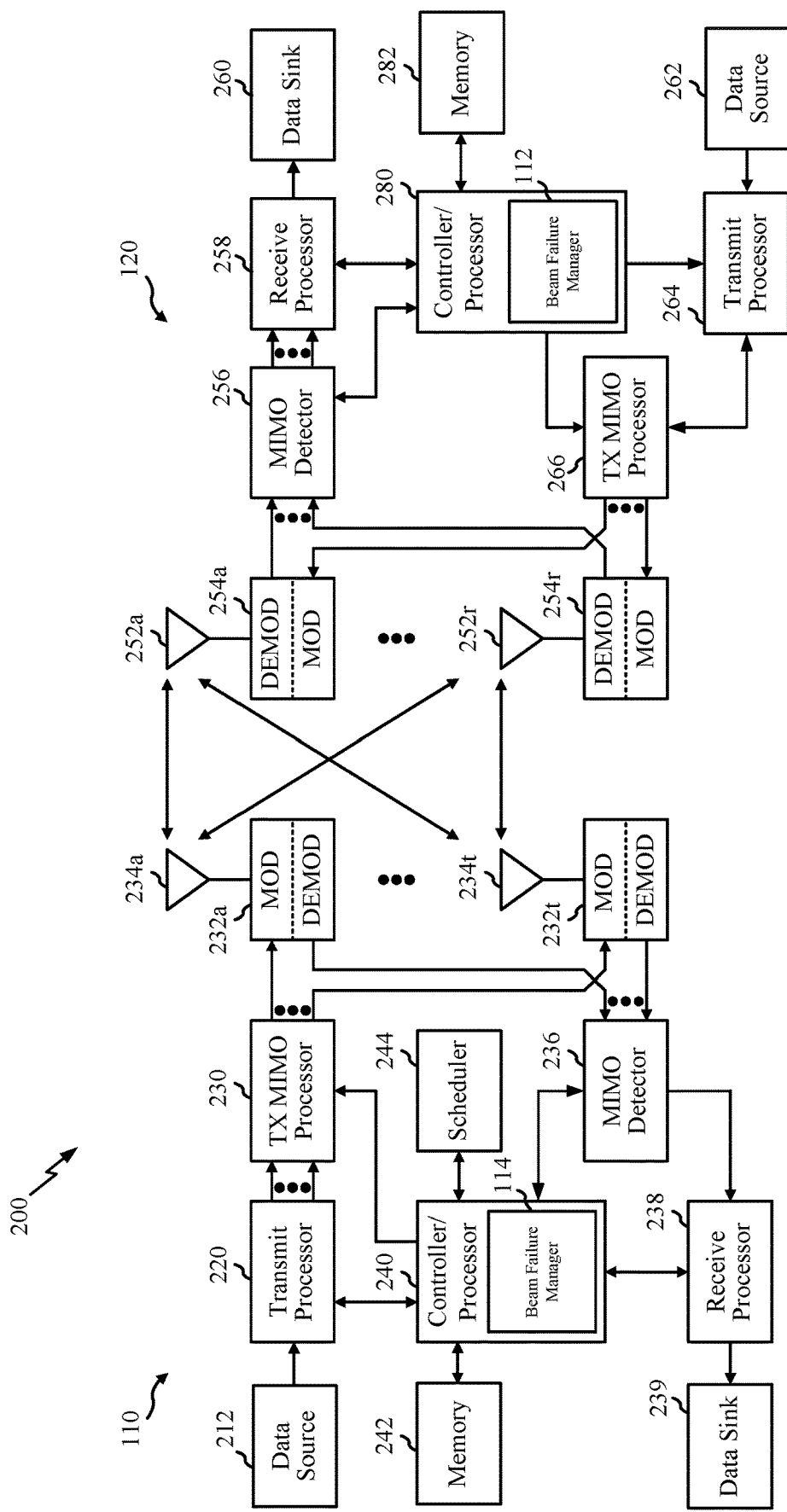
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the beam failure manager 112 and the controller/processor 280 has the beam failure manager 114, according to aspects described herein. Although shown at the Controller/Processor, other components of the UE 120a and BS 110a may be used performing the operations described herein.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Certain systems, such as NR, support carrier aggregation (CA). With CA, the UE can use multiple carriers/cells to communicate with a BS (or multiple BSs). CA involves a primary cell (PCell) and at least one secondary cell (SCell). An Scell may be configured for downlink only, or configured for both uplink and downlink. The PCell and SCell(s) can be in different frequency bands, such as a PCell in one frequency range (e.g., FR1) and the SCell in another frequency range (e.g., FR2). The PCell and SCell may use different tone spacing or subcarrier spacing (SCS), leading to different symbol lengths for the PCell and SCell(s). For example, in FR2, the symbols length for a 120 KHz SCS is eight times short than a symbol length for a 15 kHz SCS in FR1.

As mentioned above, aspects of the present disclosure relate to beam failure detection and recovery. In some systems, narrow-beam transmission and reception is useful for improving the link budget at millimeter-wave (mmW) frequencies but may be susceptible to beam failure. In mmW, direction beamforming is used between the UE and a BS, and the UE and BS communicate via a beam pair link (BPL). A beam failure generally refers to a scenario in which the quality of a beam falls below a threshold, which may lead to radio link failure (RLF). NR supports a lower layer signaling to recover from beam failure, referred to as beam recovery. For example, instead of initiating a cell reselection when a beam quality becomes too low, a beam pair reselection within the cell may be performed.

Figure 3:
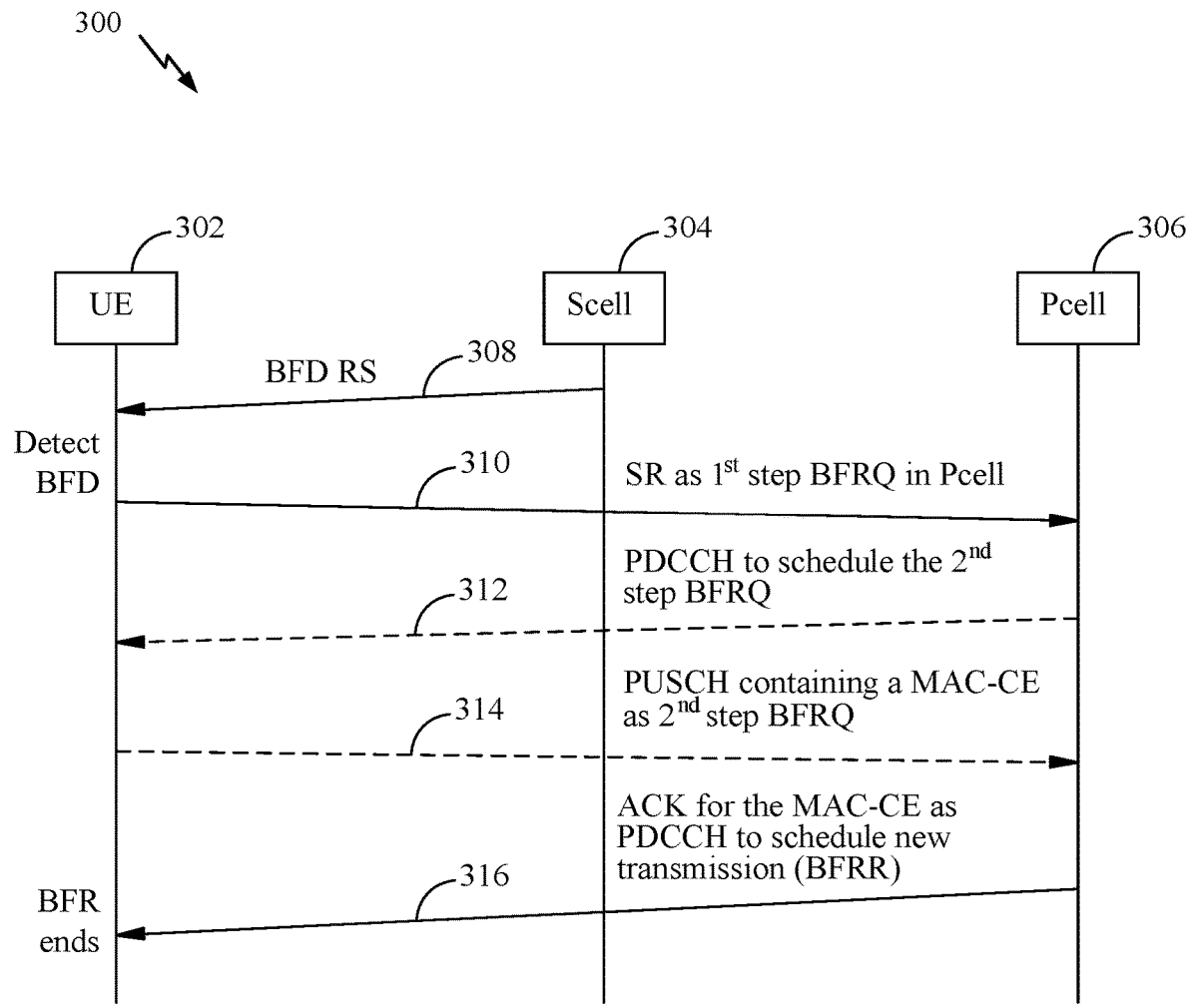
FIG. 3 is a call-flow diagram illustrating example operations for beam failure detection (BFD), in accordance with certain aspects of the present disclosure.

FIG. 3 is a call flow diagram illustrating example operations 300 for beam failure detection and recovery procedure, in accordance with certain aspects of the present disclosure. Beam failure may be detected by monitoring a beam failure detection (BFD) reference signal (RS) and assessing if a beam failure trigger condition has been met. As shown in FIG. 3, the UE 302 monitors the BFD RS 308 from the SCell 304. While only one SCell 304 is illustrated, multiple SCells may be implemented and component carriers (CCs) of the SCells may be grouped. In some examples, beam failure detection may be triggered if an estimated block error rate (BLER) of reference signals associated with a configured control resource set (CORESET) is above a threshold (e.g., 10%). In some examples, the UE 302 detects beam failure when the reference signal receive power (RSRP) of a BPL is below a threshold.

In certain aspects of the present disclosure, the UE may perform joint beam failure detection for a group of CCs, as described in more detail herein. For example, the UE may detect beam failure for one or more CCs of a group of CCs, but trigger beam failure for the entire group of CCs. The UE may transmit a beam failure recovery request (BFRQ) requesting beam failure recovery for all the CCs of the CC group, in response to detection of beam failure for only a subset of CCs of the group.

To recover the SCell 304, the UE 302 can send a BFRQ message on another cell. In some examples, the BFRQ is sent on the PCell 306, as shown in FIG. 3. In NR systems, a two-step BFRQ may be used. The BFRQ may request a new transmission. As shown in FIG. 3, after detecting beam failure, the UE 302 sends the first step (or first stage) of the BFRQ. The first step of the BFRQ message may include transmitting a scheduling request (SR) 310 on the PCell 306. The SR 310 may be sent on dedicated SR resources. The SR may request scheduling for the second step (or second stage) of the BFRQ message.

As shown in FIG. 3, the UE 302 may optionally receive a PDCCH 312 from the PCell 306, in response to the SR, scheduling the second step of the BFRQ message. The UE 302 then optionally sends the scheduled second step of the BFRQ message on the PCell 306. For example, the UE 302 optionally sends a PUSCH 314 including a MAC-CE, as shown in FIG. 3. The MAC-CE may include an index of the failed CC and a new recovery beam candidate beam. In some examples, to find candidate new beams, the UE may monitor a beam identification reference signal.

The PCell 306 responds to the BFRQ by transmitting a beam failure recovery response (BFRR) message 316 to the UE 302, as shown in FIG. 3. The BFRR message 316 may acknowledge (ACK) the MAC-CE and include an uplink grant scheduling a new transmission. For example, the uplink grant may schedule a transmission for the same HARQ process as the PUSCH carrying the MAC-CE in the step two of the BFRQ. In some examples, the BFRR is sent over a CORESET (e.g., referred to as a CORESET-BFR) the UE 302 monitors for the response.

If the response is received successfully, the beam recovery is completed and a new BPL may be established. If the UE 302 cannot detect any response within a specific time period, the UE 302 may perform a retransmission of the request. If the UE 302 cannot detect any response after a specified number of retransmissions, then the UE 302 may notify higher layers, potentially leading to RLF and cell reselection. After receiving the BFRR message 316, and before the new BPL is established, the UE 302 may communicate on the SCell 304 using a default beam.

Example Techniques for Joint Failure Detection for Component Carrier (CC) Groups Beam failure recovery (BFR) may be performed for multiple cells such as a primary cell (PCell) and a primary secondary cell (PSCell). For intra-band carrier-aggregation (CA) in a frequency range (e.g., FR2), multiple secondary cells (SCells) may be configured and multiple component carriers (CCs) may be grouped.

Certain aspects of the present disclosure are directed to techniques for jointly determining failure of SCell CC groups to reduce latency and resource overhead for BFR. For example, a UE may perform joint beam failure detection for a group of CCs. The UE may detect beam failure for one or more CCs of a group of CCs, but trigger beam failure for the entire group of CCs. For example, the UE may transmit a beam failure recovery request (BFRQ) requesting beam failure recovery for all the CCs of the CC group, in response to detection of beam failure for a subset of CCs of the group, as described in more detail herein.

Figure 4:
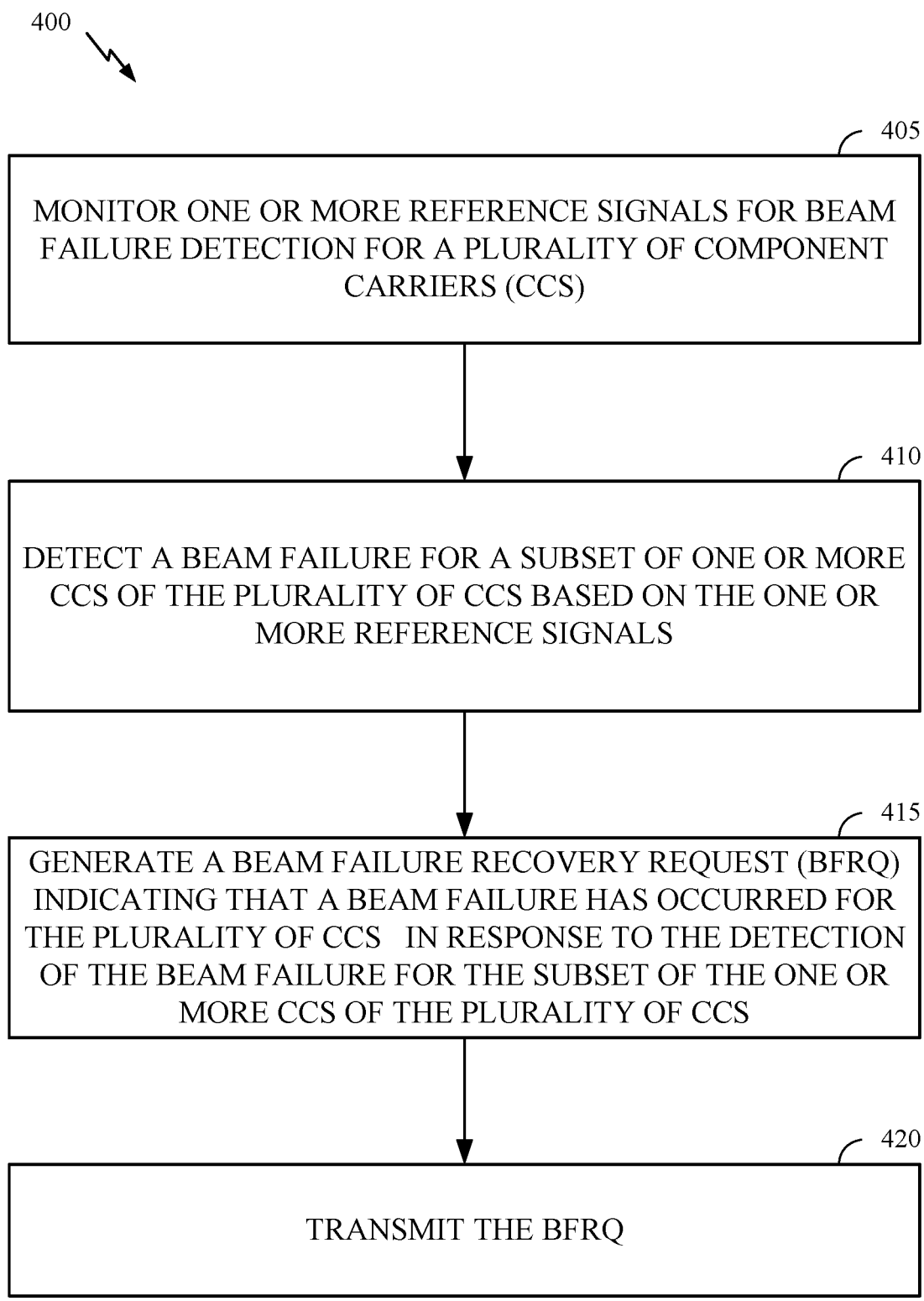
FIG. 4 is a flow diagram illustrating example operations for wireless communication, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100).

Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, with the UE monitoring one or more reference signals for beam failure detection for a plurality of CCs (e.g., a group of CCs sharing the same cell group ID), and at block 410, detecting a beam failure for a subset of one or more CCs of the plurality of CCs based on the one or more reference signals. As used herein, a subset of one or more CCs of the plurality of CCs generally refers to one or more CCs that are a subset of the plurality of CCs. At block 415, the UE generates a BFRQ indicating that a beam failure has occurred for the plurality of CCs in response to the detection of the beam failure for the subset of the one or more CCs of the plurality of CCs, and at block 420, transmits the BFRQ.

In some cases, the same reference signal of the one or more reference signals may be configured for each of the plurality of CCs, the beam failure being detected for the subset based on the reference signal. For example, the same failure detection resources (e.g., reference signal) for each of the CCs in the group. In this case, the failure of one CC explicitly indicates failure of the entire SCell group. The failure detection resources may be indicated by a higher layer via a failureDetectionResources parameter.

In certain aspects, the beam failure may be detected based on the one or more reference signals configured for a subset of one or more CCs of the plurality of CCs. For example, a reference signal (e.g., failure detection resources) may be configured for only one of the CCs and the SCells may share the same configured cell group ID. In this case, the failure of the configured CC may implicitly indicate failure of the entire SCell group.

In certain aspects, the plurality of CCs may be a group of CCs associated with the same beam and/or similar QCL property, and the BFRQ may indicate that the beam failure has occurred for the group of CCs in response to the detection of the beam failure for the subset of the one or more CCs. For example, a condition may be configured to determine joint failure of CC groups. A group of CCs may share the same analog beamformer (e.g., be associated with the same beam). The group of CCs may be in the same band on FR2. If one of the CCs (or any subset of CCs) in the group fails (e.g., beam failure is detected for one of the CCs), then the UE determines that the entire group of CCs has failed (e.g., as opposed to only the individual CC failure) and BFR is attempted. In certain aspects, the UE may signal an indication of CCs that are grouped to the BS (e.g., depending on the UE capability) to facilitate communication using the group of CCs. In certain aspects, the CC groups may be explicitly configured. In other aspects, the CC groups may not be explicitly configured, but determined based on UE capability to save resource overhead.

In certain aspects, a plurality of control resource sets (CORESETs) may be configured for the plurality of CCs. In this case, the UE may determine which CORESETs of the plurality of CORESETs have distinct quasi-co location (QCL) properties, and the UE may monitor the one or more reference signals for the CORESETs having distinct QCL properties. If a beam failure is detected for the CORESETs having distinct QCL properties, the UE may indicate via the BFRQ that the beam failure has occurred for the plurality of CCs. In other words, the UE may monitor the CORESETs with distinct QCL properties and assume that a beam failure detected for the monitored CORESETs should also be applied for other CORESETs that have the same QCL properties as the CORESETs that were monitored. In certain aspects, the QCL properties may include spatial QCL properties.

In other words, the UE may trigger a beam failure recovery if every monitored CORESET with distinct QCL-TypeD property across all CCs in the group fails. The CORESETs with distinct QCL-TypeD property may be determined by the UE. For example, for the purpose of determining the CORESET, a synchronization signal (SS)/physical broadcast channel (PBCH) block may be considered to have different QCL-TypeD properties than a CSI-RS. For the purpose of determining the CORESET, a first CSI-RS associated with a SS/PBCH block in a first cell and a second CSI-RS in a second cell that is also associated with the SS/PBCH block may be assumed to have the same QCL-TypeD properties. In certain aspects, the UE may define TypeD RSs including CORESETs with distinct QCL-D properties as the set of BFD RSs for the entire CC group.

In certain aspects, CC group failure may be determined using a combination of techniques described herein. For instance, the plurality of CCs may be a subset of configured CCs for the UE, and the BFRQ may indicate that a beam failure has occurred for the plurality of CCs if the beam failure is detected for the subset of the one or more CCs that is part of the group of CCs. Moreover, the UE may determine which CORESETs of a plurality of CORESETs (e.g., for the CCs configured for the UE) have distinct QCL properties, and the BFRQ may indicate that the beam failure has occurred for all the configured CCs for the UE if the beam failure is detected for the CORESETs having distinct QCL properties. In other words, a beam failure for a CC group may be defined based on a condition that is known by both the UE and the gNB, and beam failure for the entire CC group (e.g., all CCs configured for the UE) may be defined based on another condition (e.g., by monitoring CORESETs with distinct QCL properties).

Figure 5:
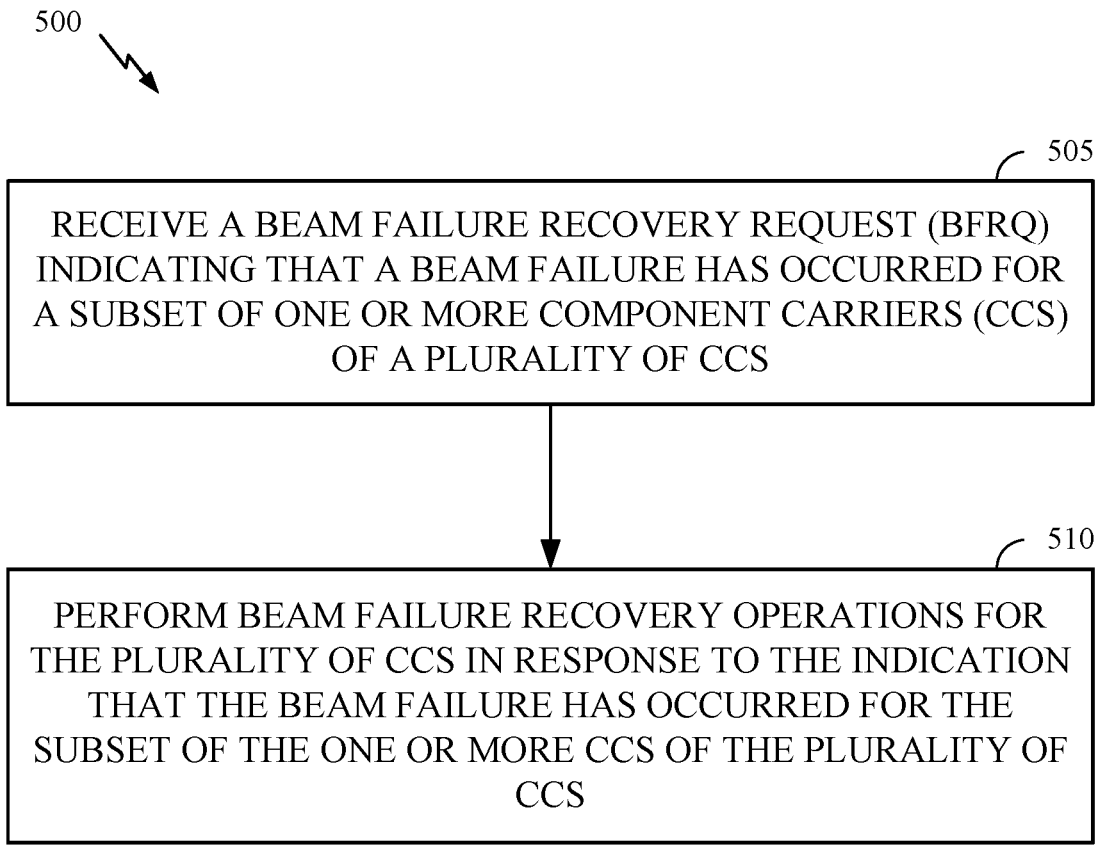
FIG. 5 is a flow diagram illustrating example operations for wireless communication, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100).

Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 505, by the BS receiving a BFRQ indicating that a beam failure has occurred for a subset of one or more CCs of a plurality of CCs, and at block 510, performing beam failure recovery operations for the plurality of CCs in response to the indication that the beam failure has occurred for the subset of the one or more CCs of the plurality of CCs. In certain aspects, the plurality of CCs may include a group of CCs sharing the same cell group ID.

In some cases, the BS may transmit one or more reference signals for detection of the beam failure. The same reference signal of the one or more reference signals may be configured for each of the plurality of CCs, as described herein. In certain aspects, the BS may determine (e.g., based on UE capability or an indication from the UE) that the plurality of CCs is associated with the same beam and/or similar QCL property. In this case, the beam failure recovery operations may be performed for the plurality of CCs in response to the determination.

Figure 6:
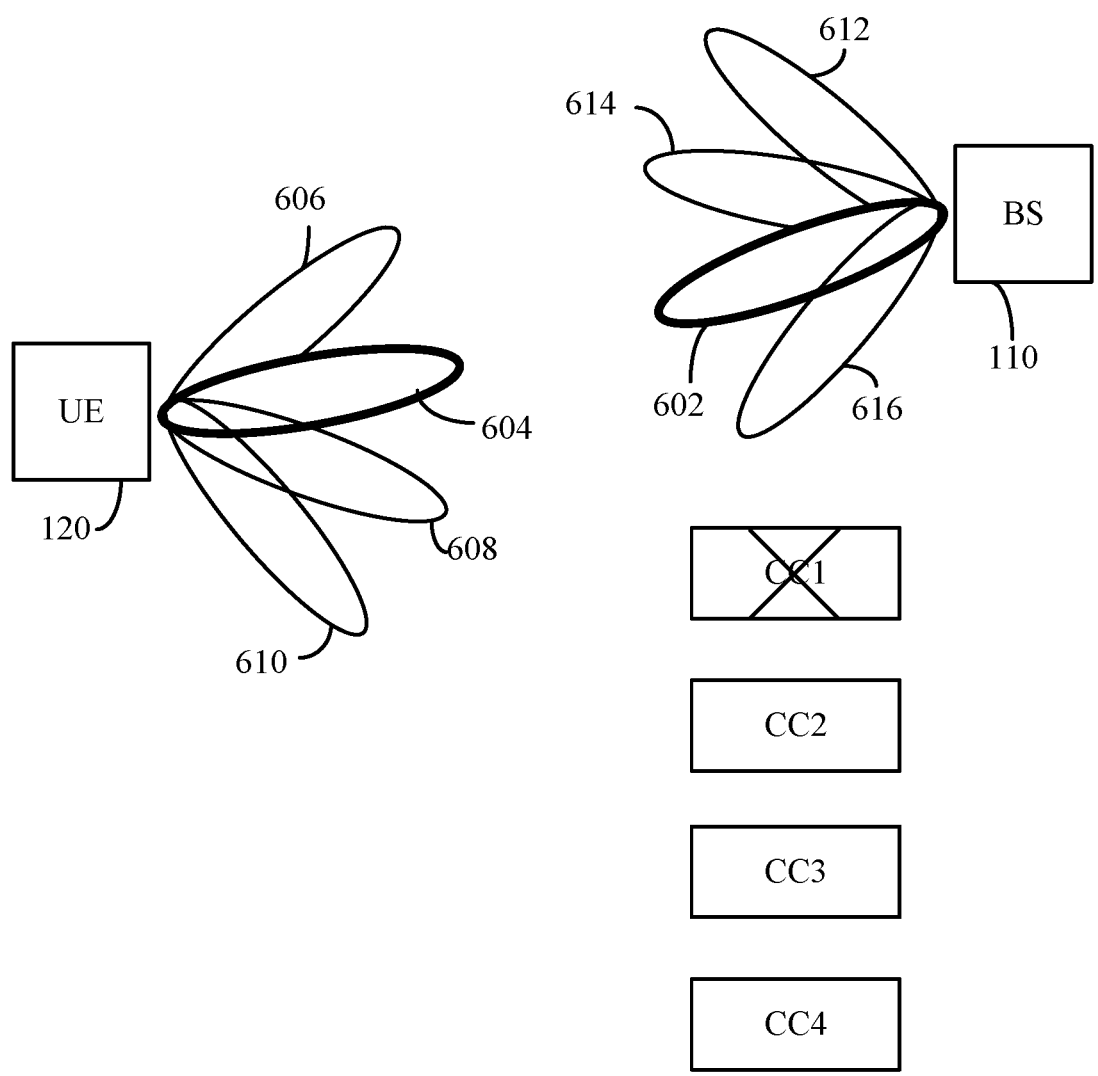
FIG. 6 illustrates multiple transmit beams and receive beams associated with multiple component carriers, in accordance with certain aspects of the present disclosure.

FIG. 6 illustrates multiple transmit beams 612, 614, 602, 616 and receive beams 606, 604, 608, 610 associated with multiple component carriers, in accordance with certain aspects of the present disclosure. Transmit beam 602 and receive beam 604 may be selected for communication using CC1. The UE 120 may monitor reference signals from BS 110 to detect beam failure for CC1, CC2, CC3, CC4. For example, reference signals transmitted using beams 602, 604 may be monitored to determine whether a beam failure has occurred for CC1. In some aspects, the UE may detect a beam failure for CC1 (or any subset of CC1, CC2, CC3, CC4), but request beam failure recovery for the entire group of CCs. For example, the UE may transmit BFRQ indicating that a beam failure has occurred for CC1, CC2, CC3, and CC4. In some aspects, the request for beam failure recovery for the entire group of CCs may be performed if the group of CCs share the same cell group identifier.

Figure 7:
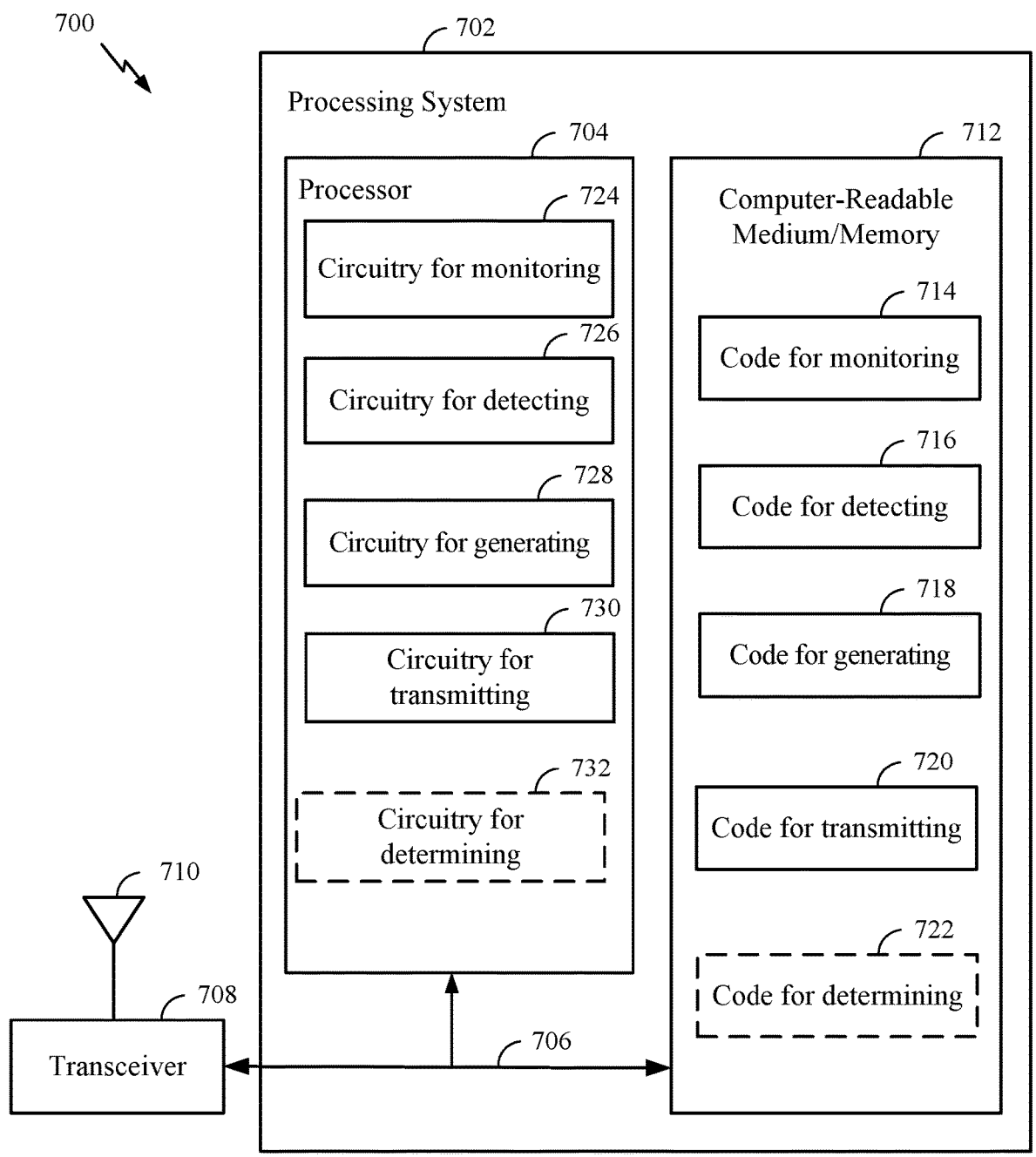
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for beam failure detection and recovery. In certain aspects, computer-readable medium/memory 712 stores code 714 (e.g., an example of means for) for monitoring; code 716 (e.g., an example of means for) for detecting; code 718 (e.g., an example of means for) for generating; code 720 (e.g., an example of means for) for transmitting. The computer-readable medium/memory 712 may optionally also include code 722 (e.g., an example of means for) for determining. One or more of code 714, 716, 718, 720, 722 may be executed by a general-purpose processor, a digital signal processor (DSP), an application-specific integrated circuit (ASIC), a field programmable gate array (FPGA) or other programmable logic device. In certain aspects, computer-readable medium/memory 712 is an example of a beam failure manager 112.

In certain aspects, alternatively or additionally, the processor 704 has circuitry configured to implement the code stored in the computer-readable medium/memory 712. The processor 704 includes circuitry 724 (e.g., an example of means for) for monitoring; circuitry 726 (e.g., an example of means for) for detecting; circuitry 728 (e.g., an example of means for) for generating; and circuitry 730 (e.g., an example of means for) for transmitting. The processor 704 may also optionally include circuitry 732 (e.g., an example of means for) for determining. One or more of circuitry 724, 726, 728, 730, 732 may be implemented by one or more of a general-purpose processor, a DSP, an ASIC, a FPGA or other programmable logic device. In certain aspects, processor 704 is an example of a beam failure manager 112.

The transceiver 708 may provide a means for receiving information such as packets, user data, or control information associated with various information channels (e.g., control channels, data channels, and information related to power saving of smart repeaters based on a triggering signal, etc.). Information may be passed on to other components of the device 700. The transceiver 708 may be an example of aspects of the transceiver 254 described with reference to FIG. 2. The antenna 710 may correspond to a single antenna or a set of antennas. The transceiver 708 may provide means for transmitting signals generated by other components of the device 700.

Figure 8:
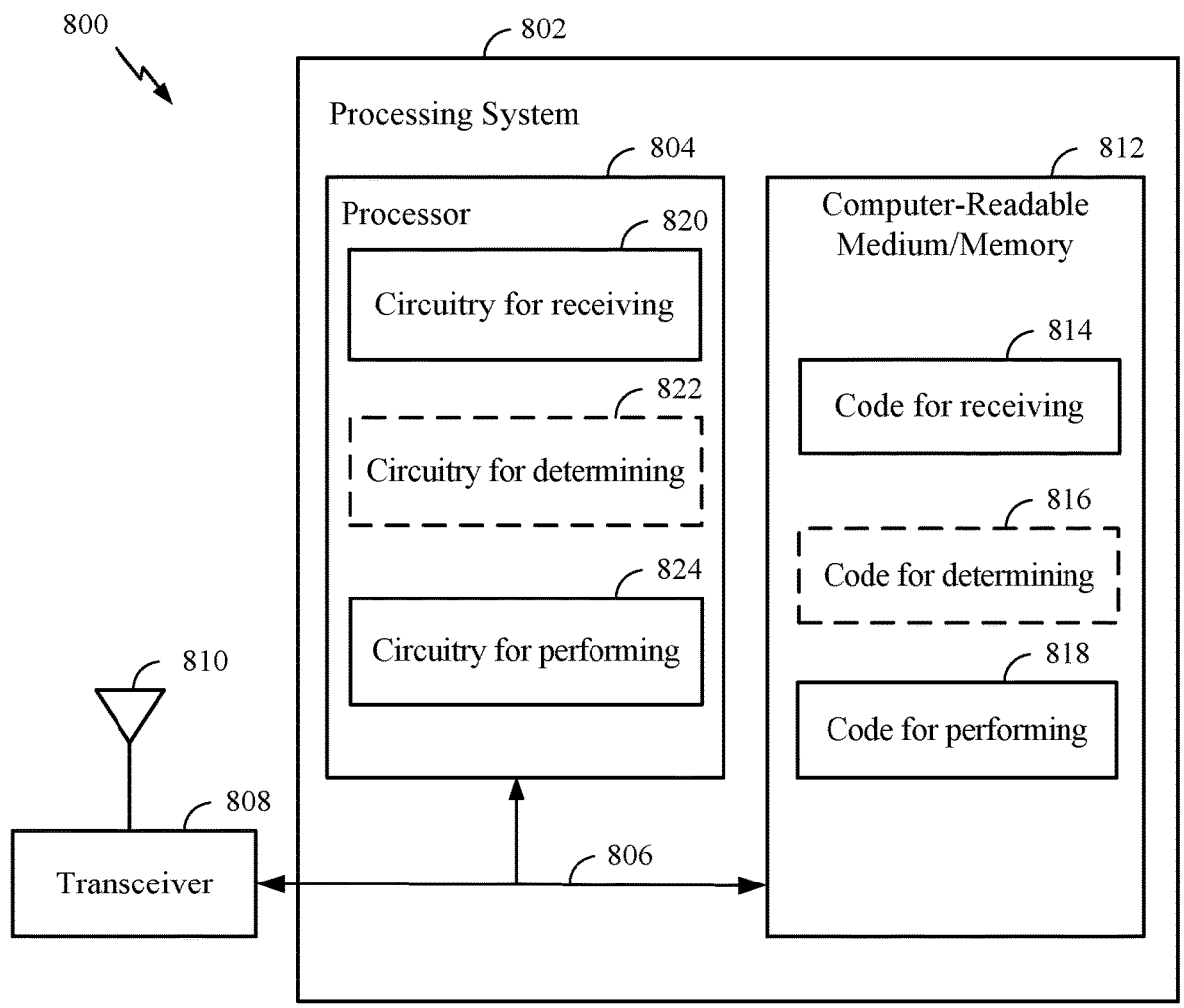
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for beam failure detection and recovery. In certain aspects, computer-readable medium/memory 812 stores code 814 (e.g., an example of means for) for receiving; and code 818 (e.g., an example of means for) for performing. The computer-readable medium/memory 812 may also optionally store code 816 (e.g., an example of means for) for determining. One or more of code 814, 816, 818 may be executed by a general-purpose processor, a DSP, an ASIC, a FPGA or other programmable logic device. In certain aspects, computer-readable medium/memory 812 is an example of the beam failure manager 114.

In certain aspects, alternatively or additionally, the processor 804 has circuitry configured to implement the code stored in the computer-readable medium/memory 812. The processor 804 includes circuitry 820 (e.g., an example of means for) for receiving; and circuitry 824 (e.g., an example of means for) for performing. The processor 804 may also optionally include circuitry 822 (e.g., an example of means for) for determining. One or more of circuitry 820, 822, 824 may be implemented by one or more of a general-purpose processor, a DSP, an ASIC, a FPGA or other programmable logic device. In certain aspects, processor 804 is an example of the beam failure manager 114.

The transceiver 808 may provide a means for receiving information such as packets, user data, or control information associated with various information channels (e.g., control channels, data channels, and information related to power saving of smart repeaters based on a triggering signal, etc.). Information may be passed on to other components of the device 800. The transceiver 808 may be an example of aspects of the transceiver 234 described with reference to FIG. 2. The antenna 810 may correspond to a single antenna or a set of antennas. The transceiver 808 may provide means for transmitting signals generated by other components of the device 800.

The beam failure managers 112, 114 may support wireless communication in accordance with examples as disclosed herein.

The beam failure managers 112, 114 may be an example of means for performing various aspects described herein. The beam failure managers 112, 114, or their sub-components, may be implemented in hardware (e.g., in uplink resource management circuitry). The circuitry may comprise of processor, DSP, an ASIC, a FPGA, or other programmable logic device, discrete gate or transistor logic, discrete hardware components, or any combination thereof designed to perform the functions described in the present disclosure.

In another implementation, the beam failure managers 112, 114, or their sub-components, may be implemented in code (e.g., as uplink resource management software or firmware) executed by a processor, or any combination thereof. If implemented in code executed by a processor, the functions of the beam failure managers 112, 114, or their sub-components may be executed by a general-purpose processor, a DSP, an ASIC, a FPGA, or other programmable logic device.

In some examples, the beam failure managers 112, 114 may be configured to perform various operations using or otherwise in cooperation with the transceivers 708, 808, respectively. In some examples, the beam failure managers 112, 114 may be configured to perform various operations using or otherwise in cooperation with the transceivers 708, 808, respectively.

The beam failure managers 112, 114, or their sub-components, may be physically located at various positions, including being distributed such that portions of functions are implemented at different physical locations by one or more physical components. In some examples, the beam failure managers 112, 114, or their sub-components, may be a separate and distinct component in accordance with various aspects of the present disclosure. In some examples, the beam failure managers 112, 114, or their sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1. A method for wireless communication by a user-equipment (UE), comprising: monitoring one or more reference signals for beam failure detection for a plurality of component carriers (CCs); detecting a beam failure for a subset of one or more CCs of the plurality of CCs based on the one or more reference signals; generating a beam failure recovery request (BFRQ) indicating that a beam failure has occurred for the plurality of CCs in response to the detection of the beam failure for the subset of the one or more CCs of the plurality of CCs; and transmitting the BFRQ.

Aspect 2. The method of Aspect 1, wherein the plurality of CCs comprises a group of CCs sharing the same cell group ID.

Aspect 3. The method of any one of aspects 1-2, wherein the same reference signal of the one or more reference signals is configured for each of the plurality of CCs, the beam failure being detected for the CC based on the reference signal.

Aspect 4. The method of any one of aspects 1-3, wherein the beam failure is detected based on the one or more reference signals configured for a single one of the plurality of CCs.

Aspect 5. The method of any one of aspects 1-4, wherein the plurality of CCs comprises a group of CCs associated with the same quasi-co location (QCL) property, and wherein the BFRQ indicates that the beam failure has occurred for the group of CCs in response to the detection of the beam failure for the CC.

Aspect 6. The method of aspect 5, wherein the group of CCs being associated with the same QCL property comprises the group of CCs being associated with the same beam.

Aspect 7. The method of any one of aspects 1-6, wherein a plurality of control resource sets (CORESETs) are configured for the plurality of CCs, the method further comprising determining which CORESETs of the plurality of CORESETs have distinct quasi-co location (QCL) properties, and wherein the one or more reference signals are monitored for the CORESETs having distinct QCL properties, the BFRQ indicating that the beam failure has occurred for the plurality of CCs in response to the detection of the beam failure for the CORESETs having the distinct QCL properties.

Aspect 8. The method of aspects 7, wherein the QCL properties comprise spatial QCL properties.

Aspect 9. The method of any one of aspects 1-8, wherein the plurality of CCs is a subset of configured CCs for the UE, and wherein the BFRQ indicates that a beam failure has occurred for the plurality of CCs if the beam failure is detected for the CC that is part of the plurality of CCs.

Aspect 10. The method of aspects 9, wherein a plurality of CORESETs are configured for the configured CCs for the UE, the method further comprising determining which CORESETs of the plurality of CORESETs have distinct QCL properties, and wherein the BFRQ indicates that the beam failure has occurred for all the configured CCs for the UE if the beam failure is detected for the CORESETs having distinct QCL properties.

Aspect 11. A method for wireless communication, comprising: receiving a beam failure recovery request (BFRQ) indicating that a beam failure has occurred for a subset of one or more component carriers (CCs) of a plurality of CCs; and performing beam failure recovery operations for the plurality of CCs in response to the indication that the beam failure has occurred for the subset of the one or more CCs of the plurality of CCs.

Aspect 12. The method of aspect 11, wherein the plurality of CCs comprises a group of CCs sharing the same cell group ID.

Aspect 13. The method of any one of aspects 11-12, further comprising transmitting one or more reference signals for detection of the beam failure, wherein the same reference signal of the one or more reference signals is configured for each of the plurality of CCs.

Aspect 14. The method of any one of aspects 11-13, further comprising determining that the plurality of CCs are associated with the same quasi-co location (QCL) property, wherein performing the beam failure recovery operations for the plurality of CCs is in response to the determination.

Aspect 15. The method of aspect 14, wherein the plurality of CCs being associated with the same QCL property comprises the plurality of CCs being associated with the same beam.

Aspect 16. An apparatus for wireless communication by a user-equipment (UE), comprising: a memory; one or more processors coupled to the memory, the memory and the one or more processors being configured to: monitor one or more reference signals for beam failure detection for a plurality of component carriers (CCs); detect a beam failure for a subset of one or more CCs of the plurality of CCs based on the one or more reference signals; generate a beam failure recovery request (BFRQ) indicating that a beam failure has occurred for the plurality of CCs in response to the detection of the beam failure for the subset of the one or more CCs of the plurality of CCs; and transmit the BFRQ.

Aspect 17. The apparatus of aspect 16, wherein the plurality of CCs comprises a group of CCs sharing the same cell group ID.

Aspect 18. The apparatus of any one of aspects 16-17, wherein the same reference signal of the one or more reference signals is configured for each of the plurality of CCs, the beam failure being detected for the CC based on the reference signal.

Aspect 19. The apparatus of any one of aspects 16-18, wherein the beam failure is detected based on the one or more reference signals configured for a single one of the plurality of CCs.

Aspect 20. The apparatus of any one of aspects 16-19, wherein the plurality of CCs comprises a group of CCs associated with the same quasi-co location (QCL) property, and wherein the BFRQ indicates that the beam failure has occurred for the group of CCs in response to the detection of the beam failure for the CC.

Aspect 21. The apparatus of aspect 20, wherein the group of CCs being associated with the same QCL property comprises the group of CCs being associated with the same beam.

Aspect 22. The apparatus of any one of aspects 16-21, wherein a plurality of control resource sets (CORESETs) are configured for the plurality of CCs, the memory and the one or more processors being further configured to determine which CORESETs of the plurality of CORESETs have distinct quasi-co location (QCL) properties, and wherein the one or more reference signals are monitored for the CORESETs having distinct QCL properties, the BFRQ indicating that the beam failure has occurred for the plurality of CCs in response to the detection of the beam failure for the CORESETs having the distinct QCL properties.

Aspect 23. The apparatus of claim 22, wherein the QCL properties comprise spatial QCL properties.

Aspect 24. The apparatus of any one of aspects 16-23, wherein the plurality of CCs is a subset of configured CCs for the UE, and wherein the BFRQ indicates that a beam failure has occurred for the plurality of CCs if the beam failure is detected for the CC that is part of the plurality of CCs.

Aspect 25. The apparatus of aspect 24, wherein a plurality of CORESETs are configured for the configured CCs for the UE, the memory and the one or more processors being further configured to determine which CORESETs of the plurality of CORESETs have distinct QCL properties, and wherein the BFRQ indicates that the beam failure has occurred for all the configured CCs for the UE if the beam failure is detected for the CORESETs having distinct QCL properties.

Aspect 26. An apparatus for wireless communication, comprising: a memory; one or more processors coupled to the memory, the memory and the one or more processors being configured to: receive a beam failure recovery request (BFRQ) indicating that a beam failure has occurred for a subset of one or more component carriers (CCs) of a plurality of CCs; and perform beam failure recovery operations for the plurality of CCs in response to the indication that the beam failure has occurred for the subset of the one or more CCs of the plurality of CCs.

Aspect 27. The apparatus of aspect 26, wherein the plurality of CCs comprises a group of CCs sharing the same cell group ID.

Aspect 28. The apparatus of any one of aspects 26-27, wherein the memory and the one or more processors are further configured to transmitting one or more reference signals for detection of the beam failure, wherein the same reference signal of the one or more reference signals is configured for each of the plurality of CCs.

Aspect 29. The apparatus of any one of aspects 26-28, wherein the memory and the one or more processors are further configured to determine that the plurality of CCs are associated with the same quasi-co location (QCL) property, wherein performing the beam failure recovery operations for the plurality of CCs is in response to the determination.

Aspect 30. The apparatus of claim 29, wherein the plurality of CCs being associated with the same QCL property comprises the plurality of CCs being associated with the same beam.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
   determining a plurality of component carriers (CCs) for grouping based on UE capability, wherein the plurality of CCs are associated with a plurality of control resource sets (CORESETs) having quasi-co location (QCL) properties;
   transmitting an indication of the plurality of CCs that have been grouped to a network entity;
   monitoring one or more reference signals for beam failure detection for one or more subsets of CCs of the plurality of CCs that have distinct QCL properties;
   detecting a beam failure for each of the one or more subsets of CCs that have the distinct QCL properties based on the one or more reference signals, wherein the beam failure for each of the one or more subsets of CCs indicates a beam failure for the plurality of CCs;
   generating a beam failure recovery request (BFRQ) indicating that the beam failure has occurred for the plurality of CCs in response to the detection of the beam failure for the subset of CCs of the plurality of CCs; and
   transmitting the BFRQ.

2. The method of claim 1, wherein the plurality of CCs comprises a group of CCs sharing a same cell group ID.

3. The method of claim 1, wherein a same reference signal of the one or more reference signals is configured for each of the plurality of CCs, the beam failure being detected for a CC of the plurality of CCs based on the reference signal.

4. The method of claim 1, wherein the beam failure is detected based on the one or more reference signals configured for a single one of the plurality of CCs.

5. The method of claim 1, wherein the plurality of CCs comprises a group of CCs associated with a same QCL property, and wherein the BFRQ indicates that the beam failure has occurred for the group of CCs in response to the detection of the beam failure for a CC of the plurality of CCs.

6. The method of claim 5, wherein the group of CCs being associated with the same QCL property comprises the group of CCs being associated with a same beam.

7. The method of claim 1, further comprising determining which CORESETs of the plurality of CORESETs have the distinct QCL properties, and wherein the one or more reference signals are monitored for the CORESETs having the distinct QCL properties, the BFRQ indicating that the beam failure has occurred for the plurality of CCs in response to the detection of the beam failure for the CORESETs having the distinct QCL properties.

8. The method of claim 7, wherein the QCL properties comprise spatial QCL properties.

9. The method of claim 1, wherein the plurality of CCs is a subset of configured CCs for the UE, and wherein the BFRQ indicates that a beam failure has occurred for the plurality of CCs if the beam failure is detected for a CC that is part of the plurality of CCs.

10. The method of claim 9, further comprising determining which CORESETs of the plurality of CORESETs have the distinct QCL properties, and wherein the BFRQ indicates that the beam failure has occurred for all the configured CCs for the UE if the beam failure is detected for the CORESETs having the distinct QCL properties.

11. An apparatus for wireless communication by a user-equipment (UE), comprising:

one or more memories comprising instructions, and
one or more processors configured, individually or in any combination, to execute the instructions and cause the apparatus to:
- determine a plurality of component carriers (CCs) for grouping based on UE capability, wherein the plurality of CCs are associated with a plurality of control resource sets (CORESETs) having quasi-co location (QCL) properties;
- transmit an indication of the plurality of CCs that have been grouped to a network entity;
- monitor one or more reference signals for beam failure detection for one or more subsets of CCs of the plurality of CCs that have distinct QCL properties;
- detect a beam failure for each of the one or more subsets of CCs that have the distinct QCL properties based on the one or more reference signals, wherein the beam failure for each of the one or more subsets of CCs indicates a beam failure for the plurality of CCs;
- generate a beam failure recovery request (BFRQ) indicating that the beam failure has occurred for the plurality of CCs in response to the detection of the beam failure for the subset of CCs of the plurality of CCs; and
- transmit the BFRQ.

12. The apparatus of claim 11, wherein the plurality of CCs comprises a group of CCs sharing a same cell group ID.

13. The apparatus of claim 11, wherein a same reference signal of the one or more reference signals is configured for each of the plurality of CCs, the beam failure being detected for a CC of the plurality of CCs based on the reference signal.

14. The apparatus of claim 11, wherein the beam failure is detected based on the one or more reference signals configured for a single one of the plurality of CCs.

15. The apparatus of claim 11, wherein the plurality of CCs comprises a group of CCs associated with a same QCL property, and wherein the BFRQ indicates that the beam failure has occurred for the group of CCs in response to the detection of the beam failure for a CC of the plurality of CCs.

16. The apparatus of claim 15, wherein the group of CCs being associated with the same QCL property comprises the group of CCs being associated with a same beam.

17. The apparatus of claim 11, wherein the one or more processors are configured, individually or in any combination, to execute the instructions and cause the apparatus to determine which CORESETs of the plurality of CORESETs have the distinct QCL properties, and wherein the one or more reference signals are monitored for the CORESETs having the distinct QCL properties, the BFRQ indicating that the beam failure has occurred for the plurality of CCs in response to the detection of the beam failure for the CORESETs having the distinct QCL properties.

18. The apparatus of claim 17, wherein the QCL properties comprise spatial QCL properties.

19. The apparatus of claim 11, wherein the plurality of CCs is a subset of configured CCs for the UE, and wherein the BFRQ indicates that a beam failure has occurred for the plurality of CCs if the beam failure is detected for a CC that is part of the plurality of CCs.

20. The apparatus of claim 19, wherein the one or more processors are configured, individually or in any combination, to execute the instructions and cause the apparatus to determine which CORESETs of the plurality of CORESETs have the distinct QCL properties, and wherein the BFRQ indicates that the beam failure has occurred for all the configured CCs for the UE if the beam failure is detected for the CORESETs having the distinct QCL properties.

* * * * *